US006217001B1

(12) United States Patent
Gluchowski et al.

(10) Patent No.: US 6,217,001 B1
(45) Date of Patent: Apr. 17, 2001

(54) PRESSURE BALANCED GAS VALVE

(75) Inventors: Paul Ludwig Gluchowski, Rochester; Raul Armando Bircann, Penfield; Dwight Orman Palmer, Rochester; Paul Timothy Gee, Mendon, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/342,849

(22) Filed: Jun. 29, 1999

(51) Int. Cl.[7] ...................................................... F16K 31/02
(52) U.S. Cl. ...................................................... 251/129.07
(58) Field of Search ................................ 251/129.07, 282

(56) References Cited

U.S. PATENT DOCUMENTS 4,553,735 * 11/1985 Brundage ............................ 251/282
4,582,294 * 4/1986 Fargo .................................. 251/282
5,046,530 * 9/1991 Gossner et al. ................. 251/129.07
5,443,241 * 8/1995 Odaira et al. ................... 251/129.07
5,701,874 * 12/1997 Sari et al. ....................... 251/129.07

* cited by examiner

*Primary Examiner*—Kevin Shaver
*Assistant Examiner*—Eric Keasel
(74) *Attorney, Agent, or Firm*—John F. VanOphem

(57) ABSTRACT

Relatively simple partially or completely pressure balanced valves are disclosed having relatively low friction and gas forces to be overcome by a solenoid actuator. Various devices are provided for sealing of the valve members to maintain low leakage of gases through the valve or into the actuator. Movable members of the valve and actuator are engaged but physically separate so they may be separately replaced. Various actuators may by applied with various valve assemblies for flexibility in meeting the requirements of alternative applications.

15 Claims, 8 Drawing Sheets

PRESSURE BALANCED GAS VALVE

TECHNICAL FIELD

This invention relates to gas valves.

BACKGROUND OF THE INVENTION

It is known in the art relating to vehicle engines to provide selective recirculation of engine exhaust gases into the intake manifold under certain operating conditions in order to maintain controlled exhaust emissions within desired limits. For controlling such exhaust gas recirculation, an EGR valve may be provided which includes a valve assembly mountable or connectable to associated intake and exhaust manifolds or systems of the engine to meter the flow of exhaust gas from the intake to the exhaust.

The EGR valve may include a valve assembly operable to close or open a passage between the intake and exhaust manifolds. An actuator assembly may be mounted on or connected with the valve assembly and include a solenoid coil and an armature actuated by the coil to open the EGR valve, which is closed by a spring when the coil is deenergized. Pressure differentials between the intake and exhaust of naturally aspirated engines with manifold fuel injection require substantial solenoid energy to open the valve. With potential application to other engines, such as turbocharged engines, direct injection gasoline engines and diesel engines, where even larger gas flows may be required, reduction of solenoid energy for valve opening is desired to allow use of available solenoid actuators with valves for various engine applications. In addition, it is desirable to reduce or eliminate the effects of intake or exhaust pressure pulsations on the armature, solenoid and closing spring mass system to improve positional stability.

SUMMARY OF THE INVENTION

The present invention provides relatively simple partially or completely pressure balanced exhaust gas recirculation (EGR) valves having relatively low friction and gas forces to be overcome by the actuator. Pressure balancing reduces the solenoid and spring energy needed to actuate the valves and balances out the effects of intake or exhaust pressure pulsations on the armature, solenoid, and closing spring mass system. Various means are provided for sealing of the valve members to maintain low leakage of gases through the valve or into the actuator. The valve and actuator may be mounted together for drop in installation into an engine assembly or they may be separately mounted for use in various engine installations. Movable members of the valve and actuator are engaged but physically separate so they may be separately replaced. Various actuators may by applied with various valve assemblies for flexibility in meeting the requirements of a alternative engine applications.

These and other features and advantages of the invention will be more fully understood from the following description of certain specific embodiments of the invention taken together with the accompanying drawings.

DESCRIPTION OF THE PREFERRED EMBODIMENT

Figure 1:
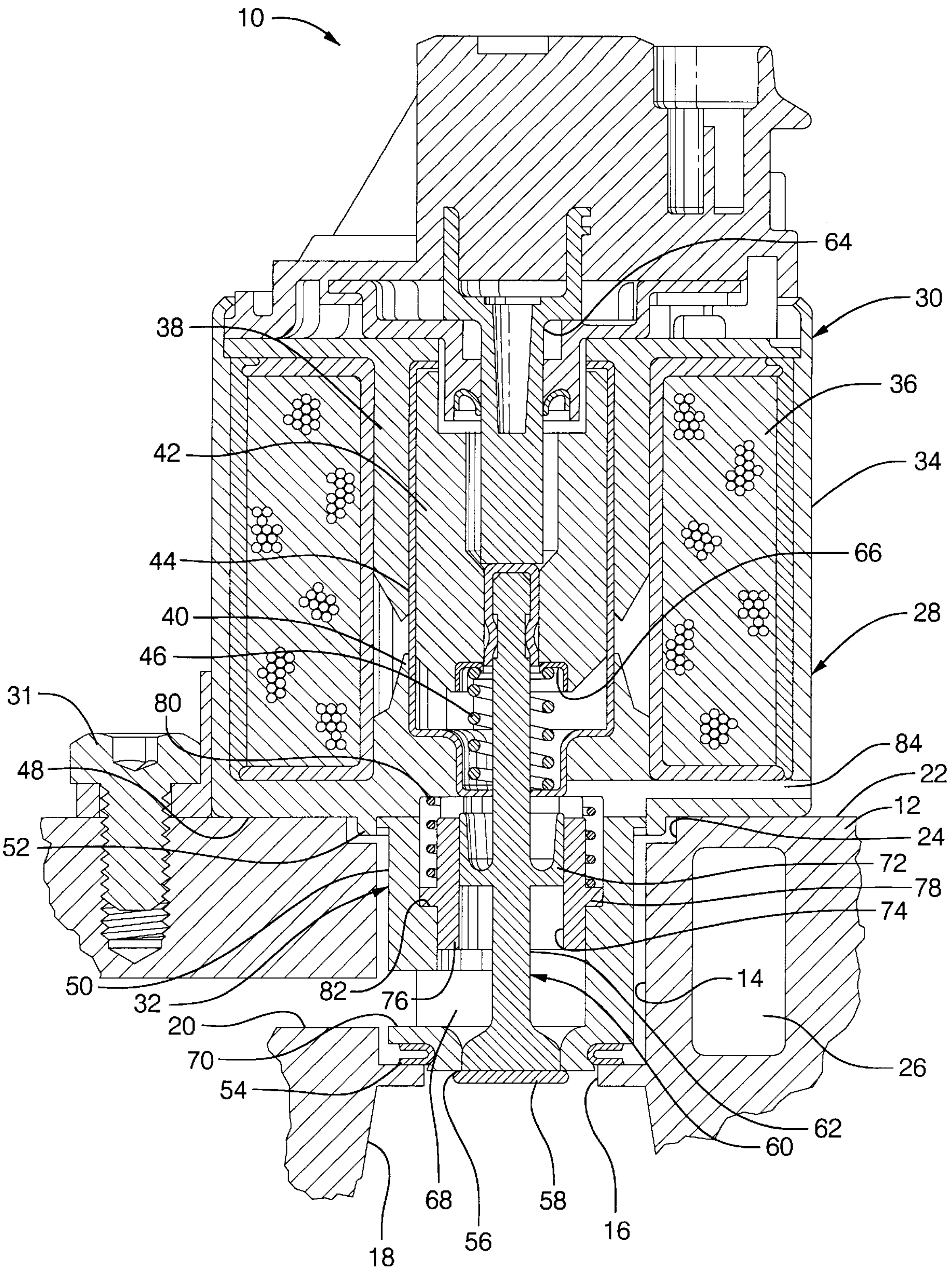
FIG. 1 is a cross-sectional view of a first embodiment of a partially balanced valve according to the invention as applied as an EGR valve in an engine.

Referring first to FIG. 1 of the drawings in detail, numeral 10 generally indicates an internal combustion engine having an exhaust manifold 12 or other exhaust gas carrying component. Manifold 12 includes a cylindrical mounting recess 14 connecting through an inlet opening 16 at one end with an exhaust gas passage 18 in the manifold 12. An outlet port 20 in the side of the recess 14 connects with an associated intake manifold, not shown, or another portion of an engine induction system. The recess 14 is open to a generally planar surface 22 of the manifold 12 with an annular counterbore 24 surrounding the opening. A coolant passage 26 in the manifold extends adjacent the recess 14 below the surface 22.

Mounted on the manifold 12 is a first embodiment of exhaust gas recirculation (EGR) valve 28 according to the invention. EGR valve 28 includes a solenoid actuator 30 mounted on the manifold surface 22 by fasteners, such as screws 31, and a valve assembly 32 associated with the actuator and mounted in the manifold recess 14. Actuator 30 includes a housing 34 enclosing a solenoid coil 36 and including upper and lower magnetic poles 38, 40 in which a hollow cylindrical armature 42 is reciprocably movable. A nonmagnetic sheath 44 surrounds the armature and provides a low friction surface on which the armature is slidable. A spring 46 biases the armature upwardly and seats against the sheath 44 near a bottom 48 of the housing seated on the upper surface 22 of the exhaust manifold 12.

The valve assembly 32 includes a valve body in the form of a generally cylindrical seat tube 50 having an upper end received within a flange 52 on the bottom 48 of the housing and extending into the counterbore 24 of the exhaust manifold. The seat tube 50 extends downward into the mounting recess 14 of the exhaust manifold and engages a seal ring 54 seated on a flange defining the inlet opening 16 into the mounting recess 14. The lower end of the seat tube 50 defines an annular valve seat 56 with which the head 58 of a valve member or pintle 60 is engagable. The pintle 60 also has a shaft or stem 62 which extends upward through the seat tube, spring and armature to engagement with a linear position sensor drive arm 64. Means, such as a spring seat and cap 66 crimped onto the stem 62, removably engages and connects the pintle with the spring 46 and the armature 42, allowing the spring to bias the armature and pintle upwardly to seat the head 58 and close the valve. The seat tube 50 has a hollow interior which defines, in part, a passage 68 connecting the valve seat 56 with a side opening 70 communicating with the outlet port 20 of the exhaust manifold.

The pintle or valve member 60 further includes a balance piston 72 axially spaced from the valve head 58 above the side opening 70 and having an axially projected area approximately equal to that of the valve head 58 when it is seated. Piston 72 is slidable within and sealingly engages an internal cylinder 74 of a pintle shaft bushing 76. Bushing 76 includes an annular flange 78 which is biased by a spring 80 into sealing engagement with a planar annular surface 82 of the seat tube 50. The bushing 76 is self-aligned laterally on the surface 82, so that alignment of the piston 72 with the cylinder 74 is inherent and the valve head 58 is allowed to center itself in the valve seat 56. Thus, good sealing contact of the valve head and seat as well as the piston and cylinder are maintained.

In operation, the solenoid actuator 30 is connected to an outside controller or power source, not shown, in order to energize the coil 36 and open the valve 32. The power source may have a constant voltage for full opening or closing of the valve or the power may be modulated in order to vary the valve opening in accordance with desired operating parameters.

When the valve is closed, valve head 58 engages valve seat 56, blocking exhaust gas flow from the manifold passage 18 into the valve body formed by the seat tube 50. During this time, variations in intake manifold pressure acting in the passage 68 within the seat tube 50, are balanced by the relatively equal axially projected areas of the valve head 58 and piston 72 on which the varying pressures act. When the solenoid coil 36 is energized, the armature 42 is actuated downwardly against the bias of spring 46, opening the valve and allowing exhaust gas to flow from the manifold passage 18 through the inlet opening 16 into the transfer passage 68 and out the side opening 70 to the manifold outlet port 20 which connects with the engine intake manifold, not shown.

The close fitting of the piston 72 within the cylinder 74 and the floating seal provided by engagement of the pintle shaft bushing flange 78 against the annular surface 82 of the seat tube, which is maintained by the force of the spring 80, minimizes the leakage of gases between the passage 68 and the exterior of the valve. A vent passage 84 is provided in the lower portion of the solenoid housing 34 to relieve any gas pressure which might otherwise develop in this location and prevent the escape of exhaust gas into the solenoid housing. The coolant passage 26 in the exhaust manifold is positioned to protect the solenoid actuator mounted on the manifold from the high exhaust gas temperatures passing through the valve assembly 32 of the EGR valve.

Figure 2:
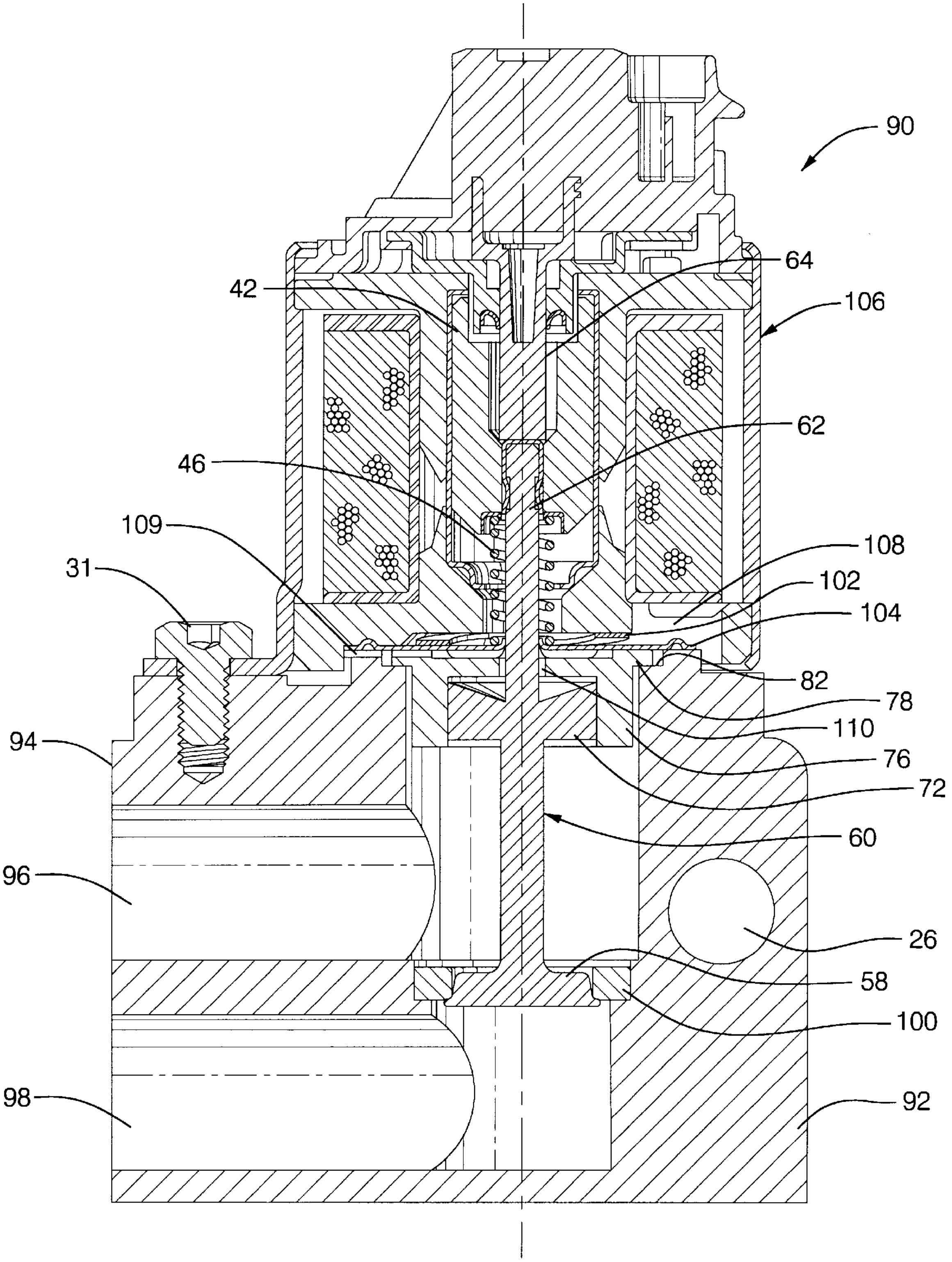
FIG. 2 is a view similar to FIG. 1 showing a second embodiment of an EGR valve mounted in an attached base.

FIG. 2 of the drawings illustrates a second embodiment of EGR valve according to the invention which is generally indicated by numeral 90. In general, valve 90 operates in much the same manner as the valve 28 previously described and, where appropriate, like numerals indicate similar parts as to which further description is thought to be unnecessary. There are, however, a number of differences in construction which are described below.

In valve 90, the valve body 92 is formed as a base having a mounting face 94 that is attachable against an associated surface of an internal combustion engine, not shown. Alternatively, the valve body could be part of a manifold or other component of the engine as in the embodiment of FIG. 1. The valve body 92 includes dual passages 96, 98 which extend through the base or body 94 and are connectable with associated passages in the induction system and exhaust system of the associated engine. Internally, passages 96, 98 are joined through a pressed in and staked valve seat 100 which defines an orifice connecting the two passages whenever the valve is open. Varying induction system pressures which exist in passage 96 act, as in EGR valve 28, upon approximately equal axially projected areas of the head 58 and piston 72 of valve member 60 so as to balance out the effect of varying induction system pressures in the same manner as in valve 28.

The piston 72 is movable within a floating bushing 76, as before, however, the bushing is urged downward by a wave spring 102 instead of the coil spring of valve 28. The flange 78 is slidable on an annular surface 82 of the valve body to seal against leakage around the exterior of the bushing. A thin walled gas shield 104 is applied between the valve body 92 and solenoid actuator 106 to minimize the escape of exhaust gases into the solenoid actuator. Vents 108, 109, located above and below the gas shield, communicate the opposite sides of the gas shield separately with atmosphere and, thus, minimize the transfer of gases between the actuator and the valve body. The diameter of the pintle shaft 62 as it passes through the floating bushing 76 is sized to provide a clearance 110 between the bushing and the shaft 62. This allows communication of ambient pressures to the upper side of the balance piston 72 for balancing the forces and opposing the leakage of exhaust gases past the piston.

A coolant passage 26 is provided in the valve body to limit the transfer of exhaust gas temperatures to the solenoid actuator, as before. The actuator 106 is mounted to the valve body 92 as by screws 31 to form the complete EGR valve ready for mounting on an associated engine.

Figure 3:
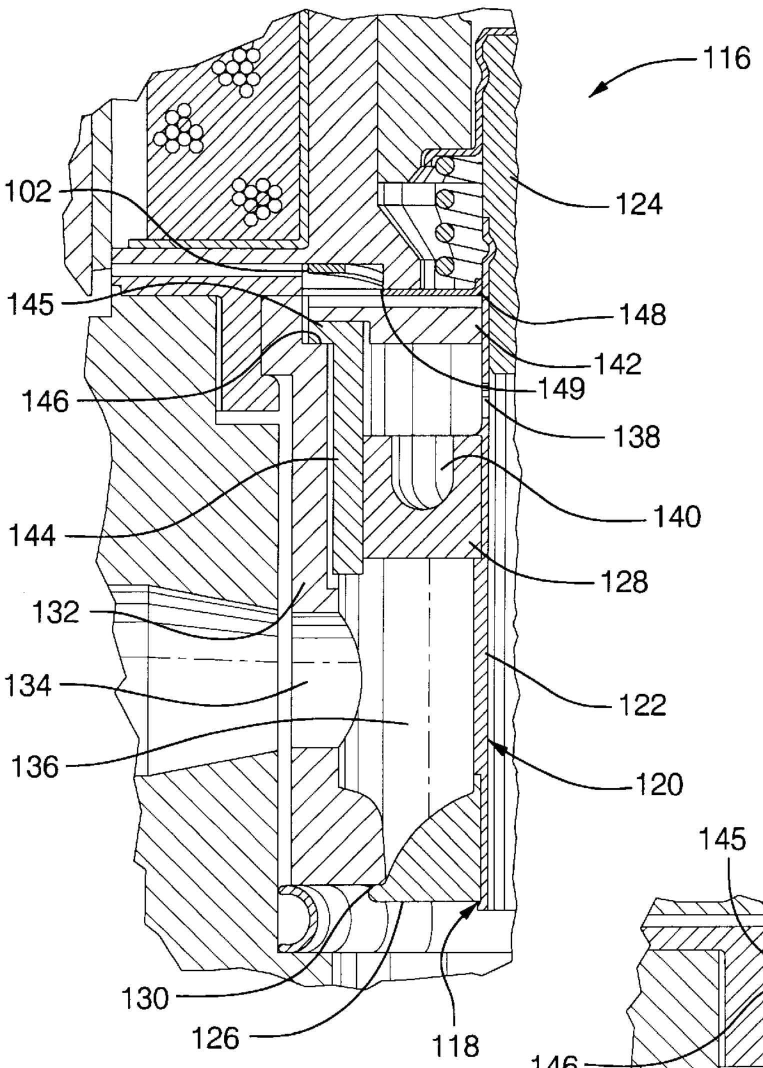
FIG. 3 is a fragmentary cross-sectional view of a third embodiment with full balancing and modified seals.

FIG. 3 illustrates a third embodiment of EGR valve 116 which represents the first of several embodiments to be described which are suitable for use in diesel or gasoline direct injection engines, where both exhaust and intake manifold pressures may significantly vary.

In these embodiments, both intake and exhaust system pressures are approximately balanced on the valve so that variations in either one will have little effect on the opening and closing forces required to actuate the valve. In addition, the direction of exhaust gas flow can be reversed so that he exhaust gas flows from a side port into a central chamber and then, when the valve is open, out past the valve head to the intake manifold or engine induction system which is connected to a lower opening or orifice of the valve that is controlled by a valve head. The valve can also be operated with a gas flow direction as described with respect to FIGS. 1 and 2.

EGR valve 116 is exemplary in that the pintle or valve member 118 has a stem or shaft 120 which includes a hollow or tubular lower portion 122 attached to a solid upper portion 124. A head 126 is mounted on the lower end of the tubular portion while a balance piston 128 is mounted near the upper end of the tubular portion. The balance piston is retained axially by staking the tubular portion 122 where it interfaces the balance piston 128. The valve head 126 engages a valve seat 130, formed at the lower end of a seat tube 132 which forms the valve housing or valve body.

Exhaust gas enters through a side opening 134 in the seat tube into a transfer chamber 136 where exhaust system pressures are exerted in opposite directions on the approximately equal axially projected areas of the valve head and the piston, thereby balancing exhaust pressures in the same manner as the intake or induction system pressures were balanced in the previous embodiments. Induction system pressures are also balanced, in that intake pressure acting on the lower surface of the valve head 126 is also conducted through the tubular lower portion 122 of the shaft through an opening 138 to a balance chamber 140 located above the balance piston 128 and below a floating shaft seal 142. Thus, intake pressures are exerted on the outer ends of the valve head and piston leading to approximate balancing of the intake forces on the valve.

The floating shaft seal 142 engages outwardly the upper end of a floating bushing 144 which defines a cylinder in which the piston 128 reciprocates. Bushing 144 also includes a flange 145 which engages a planar annular surface 146 of the seat tube or valve housing 132. Thus, gas pressures within the intake and exhaust gas exposed chambers are sealed to minimize leakage from these chambers. A wave spring 102 is provided to maintain sealing pressure on the floating shaft seal 142 and floating bushing 144. A seal 148, such as GARPHOIL or TEFLON, engages the shaft 120 to block gas leakage into the actuator and direct it out a vent 149. Piston 128 can be allowed to float radially or rock slightly on the tubular portion 122 of shaft 120 which allows the piston to be self aligned with the inner cylinder surface of the floating bushing 144. It may also enhance alignment of the pintle valve head 126 and seat 130. This floating piston feature may also be applied in all of the balance pistons subsequently discussed.

Figure 4:
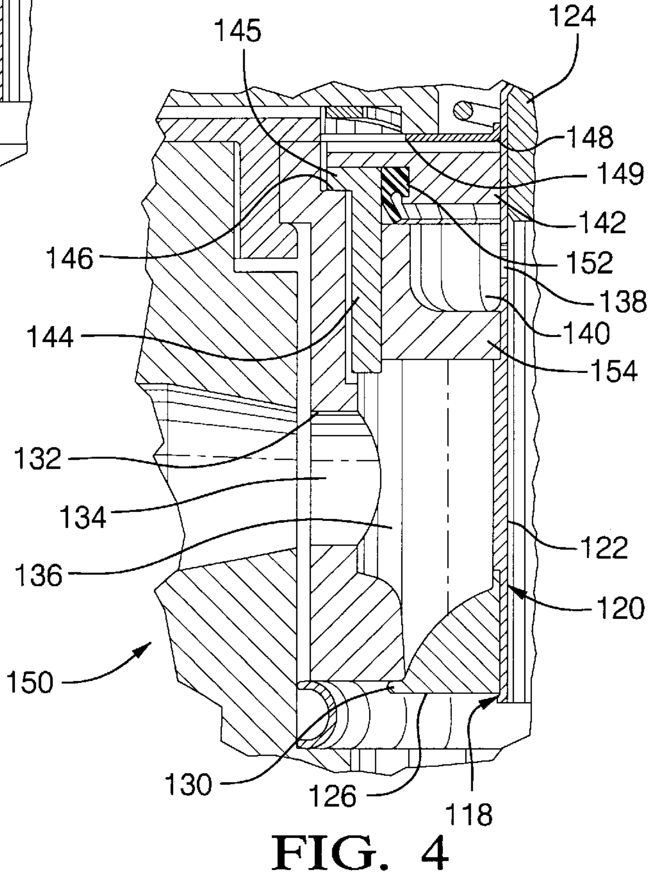
FIG. 4 is a fragmentary cross-sectional view of a fourth embodiment modified from that of FIG. 3

FIG. 4 discloses a fourth embodiment of EGR valve 150 which represents a modification of the embodiment of FIG. 3. In valve 150, an optional lip seal 152 is provided that engages an upper end of the balance piston 154 to more positively seal against leakage between intake and exhaust portions when the valve is closed. In other respects, valve 150 in FIG. 4 is similar to valve 116 in FIG. 3, wherein like numerals indicate like or similar parts.

Figure 5:
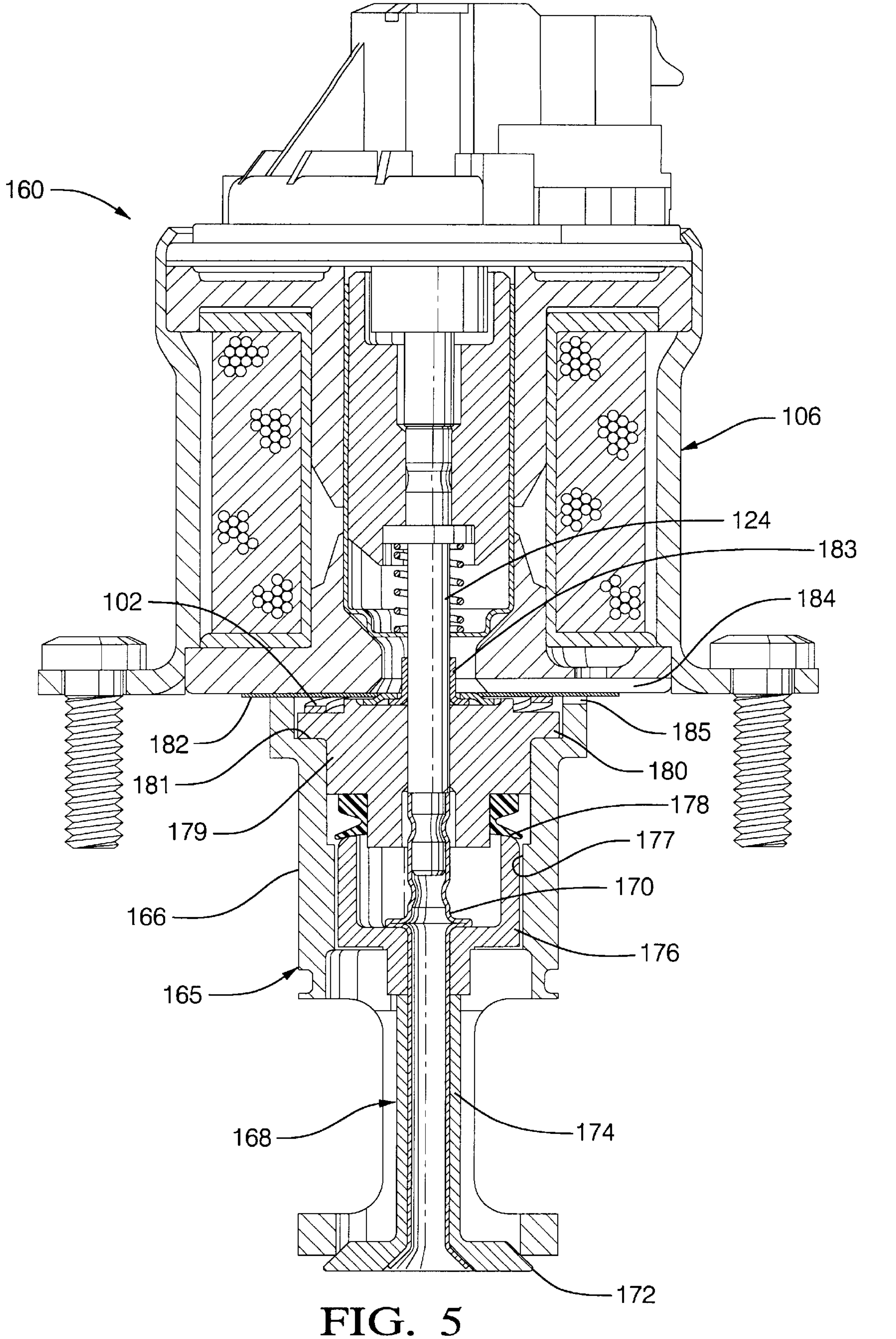
FIG. 5 is a cross-sectional view of a fifth embodiment with a specific seal arrangement.
Figure 6:
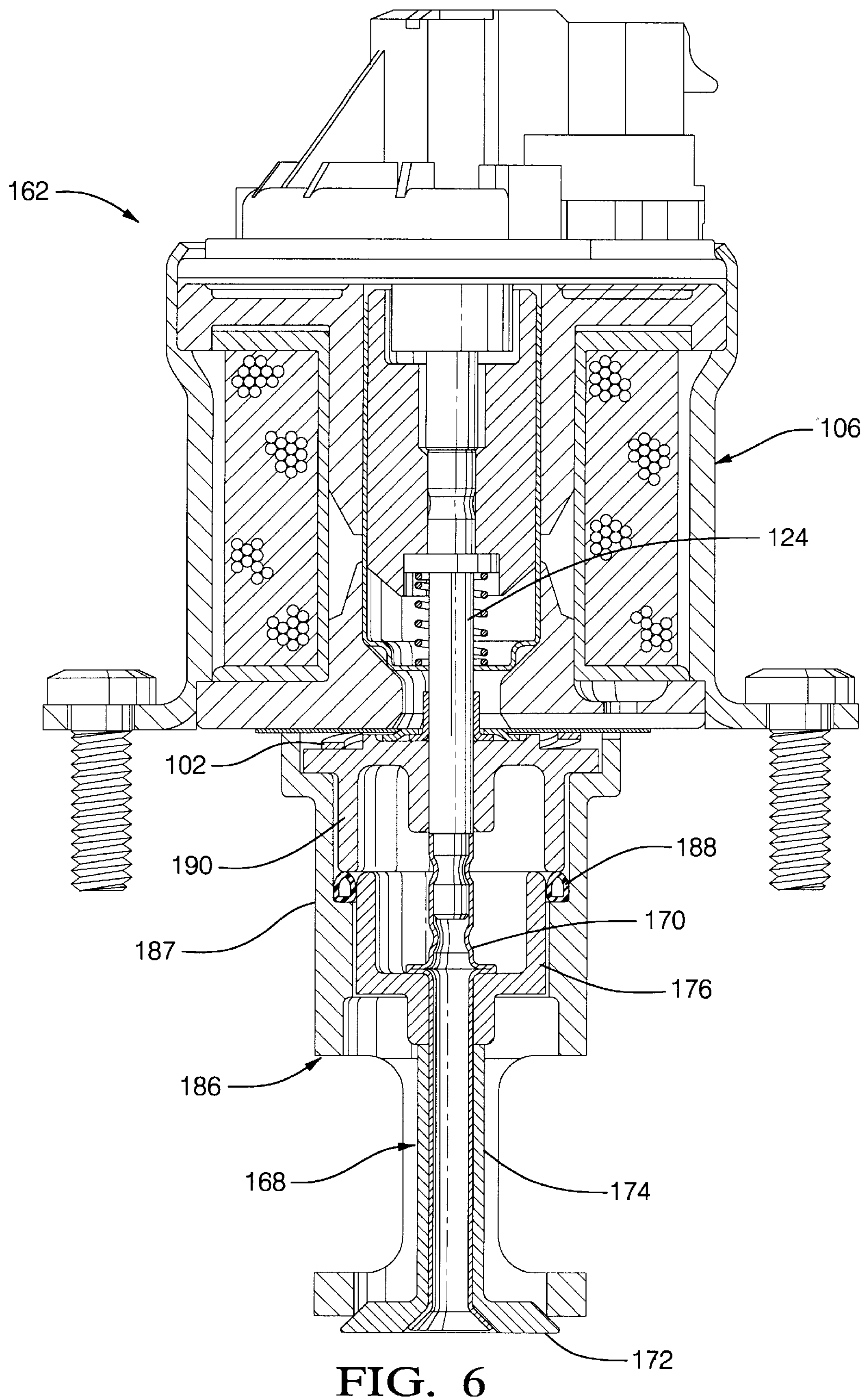
FIG. 6 is a cross-sectional view similar to FIG. 5 of a sixth embodiment with an alternative seal arrangement.
Figure 7:
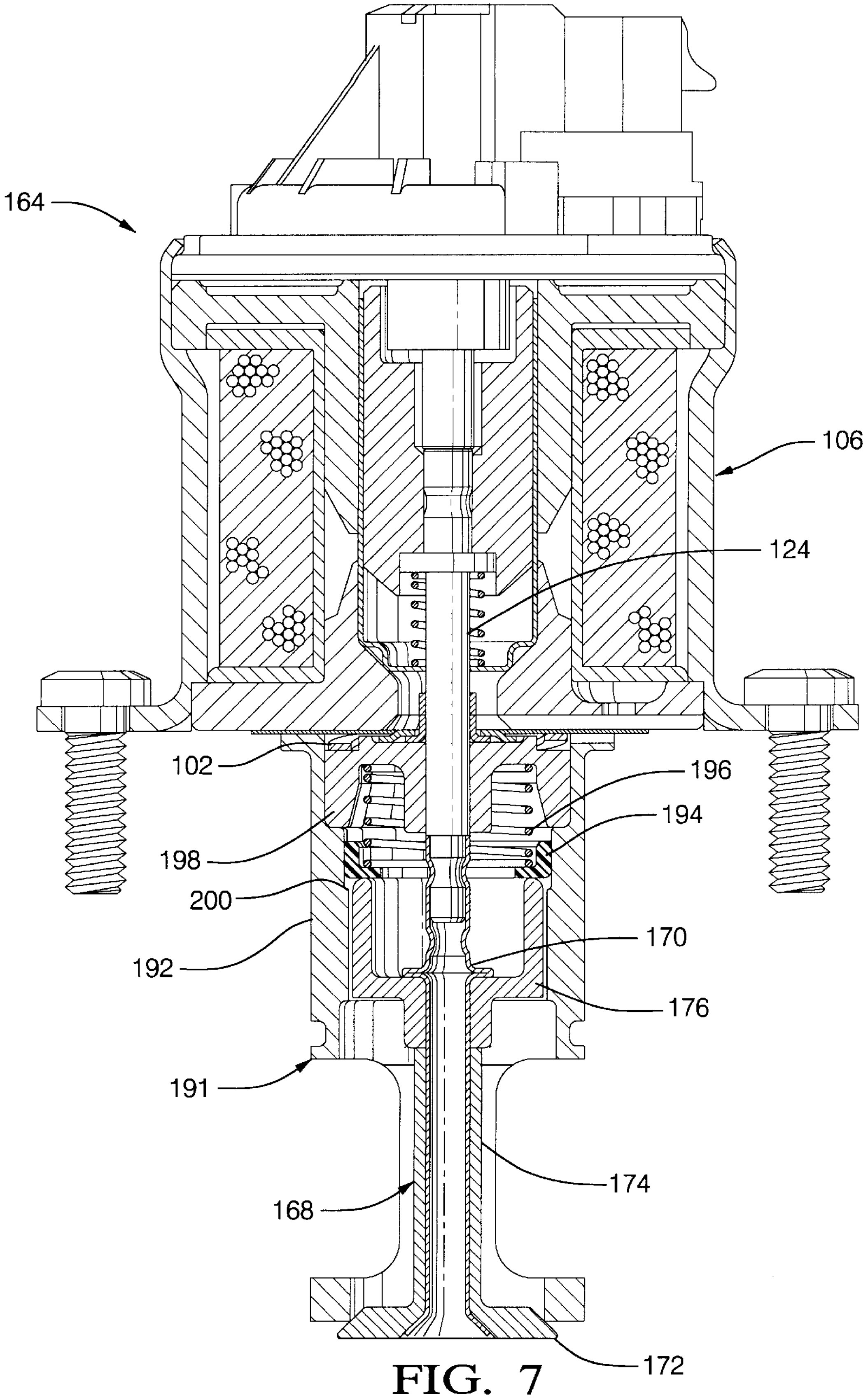
FIG. 7 is a cross-sectional view similar to FIGS. 5 and 6 of a seventh embodiment with another seal arrangement.

Referring now to FIGS. 5–7, there are shown three additional embodiments of EGR valves 160, 162 and 164. These valves are similar in that they each include a solenoid actuator 106 which bolts directly onto an engine component in which a valve assembly is received.

EGR valve 160, shown in FIG. 5, has a valve assembly 165 that includes a seat tube 166 forming the valve body. A valve member 168 is received in the seat tube and includes a formed tubular lower portion 170 which holds together a separate head 172, tubular shaft 174 and balance piston 176. The piston 176 reciprocates in a cylinder 177 formed by an inner surface of the seat tube 166. The balance piston 176 is hollow and open at an upper end. In the closed position of the valve 160, an annular upper edge of the piston 176 engages a lip seal 178 which prevents gas transfer between the intake and exhaust systems through the valve when the valve is closed. The lip seal 178 is carried by a floating shaft seal 179 having a flange 180 which is urged downwardly against a sealing surface 181, as before, by a wave spring 102 seated against a gas shield 182. A floating actuator seal 183 is seated on the shaft seal 179 and surrounds the shaft upper portion 124 to limit the passage of gases up into the solenoid actuator 106. Vents 184, 185 are provided above and below the gas shield 182 to minimize gas transmission between the valve body or seat tube 166 and the solenoid actuator 106.

EGR valve 162, shown in FIG. 6, is generally similar to valve 160 but the valve assembly 186 differs in details of the seat tube 187 which carries a radial piston seal 188 that engages an outer surface of the balance piston 176 when the valve is closed. The radial piston seal 188 is also engaged by the lower edge of a modified floating shaft seal 190 which is urged downwardly by the wave spring 102, as before. The construction is otherwise similar to that of valve 160.

EGR valve 164, shown in FIG. 7, is again similar to valves 160 and 162 but the valve assembly 191 differs in the modified form of the seat tube 192 which carries a floating face and radial piston seal 194. Seal 194 is biased by a spring 196 against the upper end of the balance piston 176 when the valve is closed. The spring 196 acts between the seal 194 and a modified floating shaft seal 198. Seal 194 also radially contacts a cylinder surface within the seat tube 192, thus preventing gas leakage either along the cylinder wall or past the end of the piston when the valve is closed. The axial travel of the seal 194 and its engagement with the balance piston 176 is controlled by a step 200 in the seat tube 192. The step 200 limits downward motion so the seal 194 is engaged by the balance piston for only a short distance near the top of its travel near and in the valve closed position. In other respects, the embodiment of valve 164 is similar to valves 160 and 162, previously described.

Figure 8:
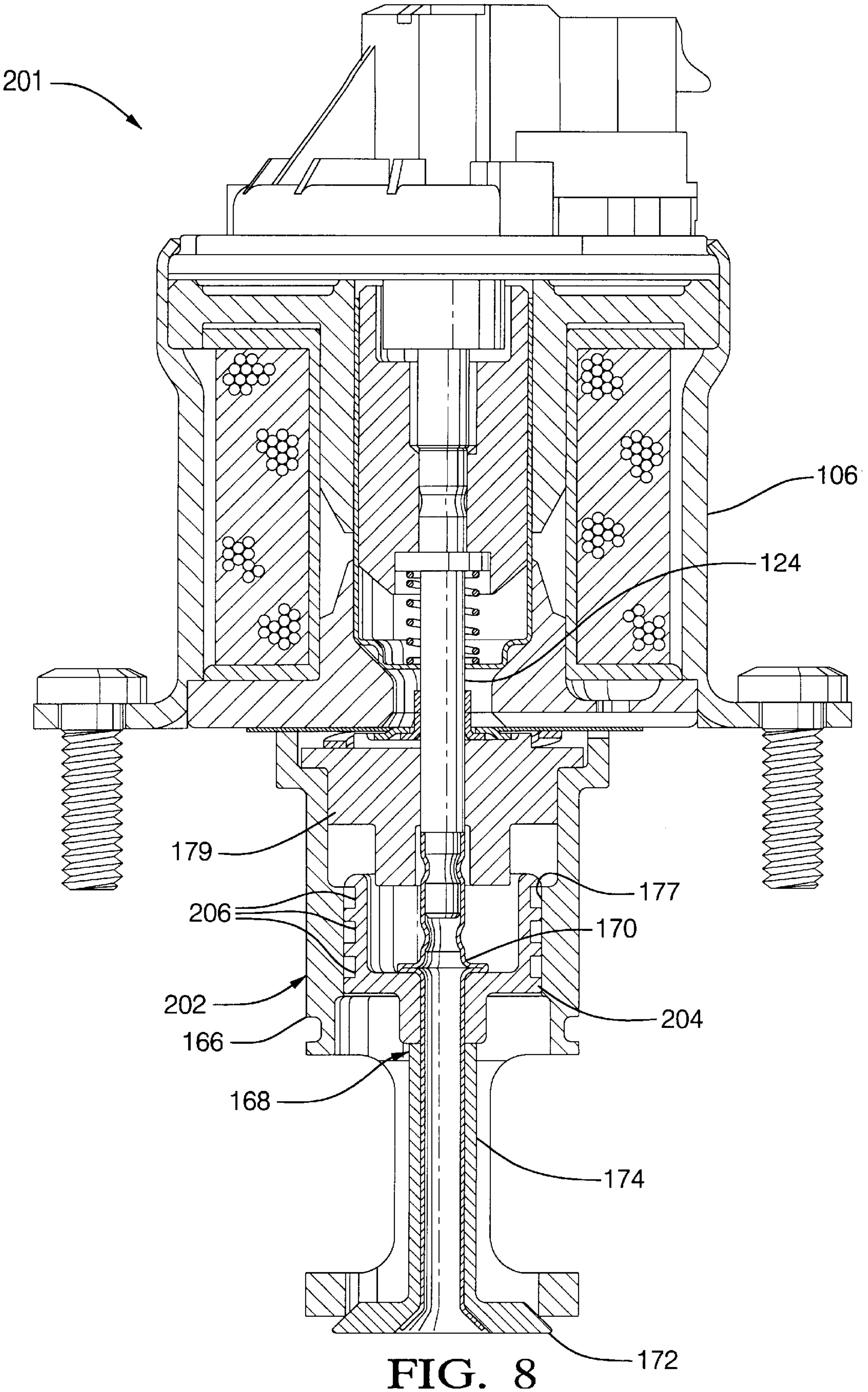
FIG. 8 is a cross-sectional view similar to FIG. 5 but showing an alternative piston arrangement.

FIG. 8 illustrates an EGR valve 201 having a valve assembly 202 similar to assembly 165 of FIG. 5. In valve assembly 202, a balance piston 204 is modified to include external grooves 206. The groove edges scrape off any carbon build up from the cylinder 177 of the seat tube 166 and thus minimize frictional changes that might otherwise occur over time in the valve operation.

Figure 9:
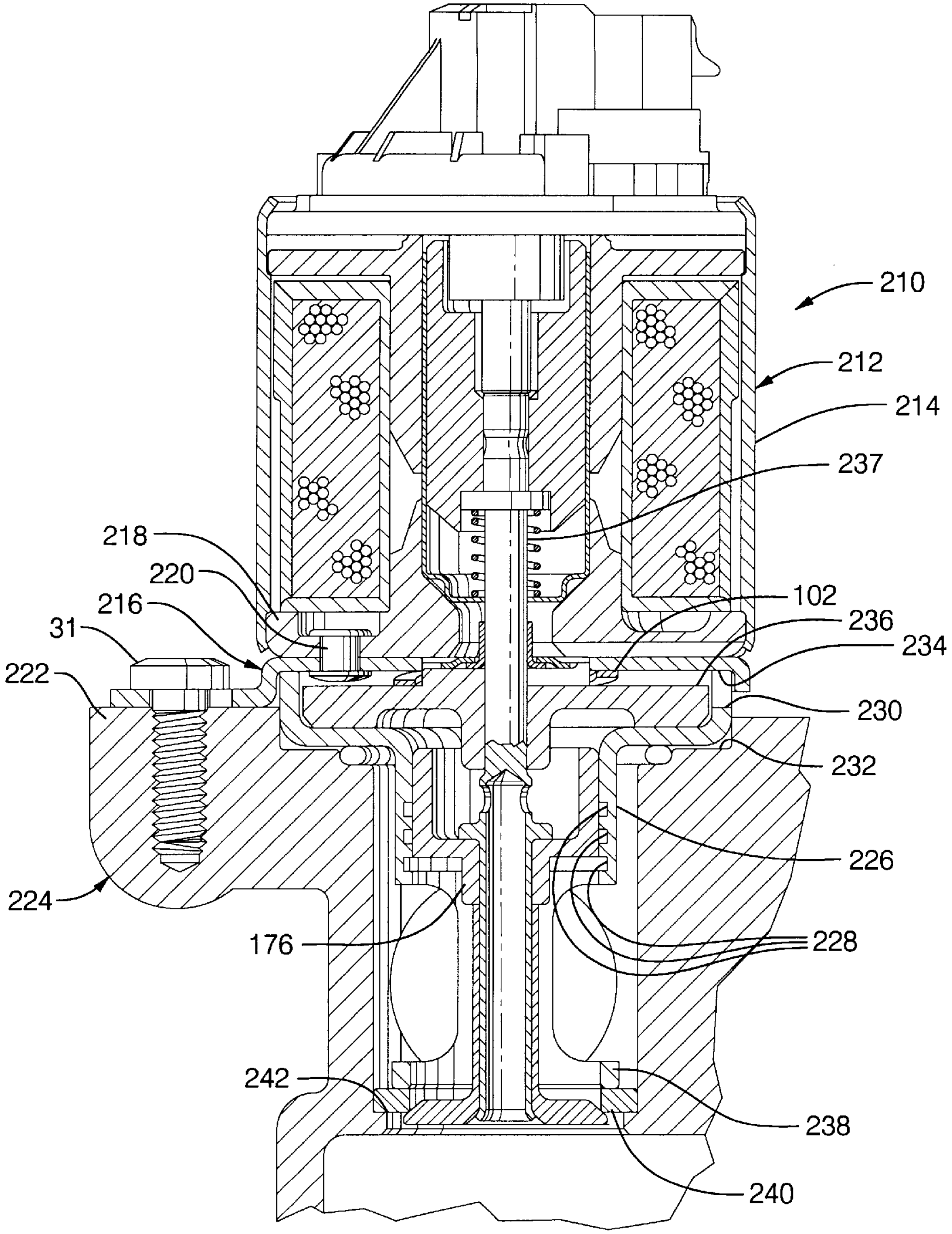
FIG. 9 is a cross-sectional view similar to FIGS. 5–7 but including various alternative features.

FIG. 9 shows another EGR valve 210 similar to those of FIGS. 3–8 but having certain modified features. A solenoid actuator 212 is provided having internal structure generally like those of the previously described embodiments. However, the housing 214 is modified to include a separate base plate 216 which is attached to the lower magnetic pole 218 by rivets 220. The base plate 216 is then attached to the associated valve body, manifold or other engine component 222 by screws 31 in a conventional manner.

The valve assembly 224 includes a seat tube 226 having a cylinder with internal grooves 228 that scrape off carbon buildup as do the piston grooves 206 of FIG. 9. The upper end of the seat tube 226 is radially enlarged with a cylindrical flange 230 that is received in circular recesses 232, 234 of the engine component 222 and the actuator base plate 216 respectively. A large floating bushing 236 is mounted on the solid upper portion of the pintle shaft 237 and is urged against an annular surface of the seat tube by a wave spring 102 to seal against exhaust gas leakage as before. The pintle shaft 237 is one piece with the solid and hollow portions formed integrally. At the lower end, the seat tube 226 has a seat ring 238 that engages a separate valve seat 240 to hold it in place in a counterbore 242 of the engine component 222.

In all of the previously described embodiments, the valve member or pintle is in contact with, but not attached to, the armature in the solenoid actuator. Thus, with appropriate component design, a solenoid actuator may be replaced without disturbing the valve assembly of any of the EGR valves illustrated. Further, this feature allows interchange of varying forms of actuators with various arrangements of valve assemblies to provide numerous variations in the EGR valves with a minimum of differing component parts.

While the invention has been described by reference to EGR applications and certain preferred embodiments thereof, it should be understood that numerous other applications and changes could be made within the spirit and scope of the inventive concepts described. Accordingly it is intended that the invention not be limited to the disclosed EGR application or embodiments, but that it have the full scope permitted by the language of the following claims.

What is claimed is:

1. A valve for metering gas, said valve comprising:

a valve body including a passage, the valve body having a valve seat internally defining a flow orifice that is closable to cut off gas flow through the passage;

a cylinder open to the passage and axially aligned with the valve seat orifice;

a valve member in the passage and including a valve head engagable with the valve seat to close the orifice;

a piston on the valve member and slidable in the cylinder, the piston and the valve head having, when the valve is closed, opposing approximately equal axially projected cross-sectional areas exposed to the passage for balancing the effects of varying pressure in the passage on the valve member; and seal means between the piston and the valve body for limiting leakage past the piston and cylinder;

wherein said seal means includes a floating bushing defining said cylinder and slidably receiving said piston, said bushing having a flange slidably engagable with a sealing surface of the valve body and allowing limited lateral motion of the bushing for alignment with the piston; and a biasing member urging the floating bushing axially to force the flange of the bushing against the sealing surface of the valve body for preventing leakage of fluid past the piston between the cylinder and the valve body. body.

2. A valve as in claim 1 wherein said biasing member is a coil spring acting between the flange and a wall of the solenoid actuator.

3. A valve as in claim 1 wherein said biasing member is a wave spring acting between the bushing and a wall of the solenoid actuator.

4. A valve as in claim 1 including a floating shaft seal surrounding the valve member and extending laterally into engagement with said bushing, said biasing member acting against the shaft seal to urge the bushing axially.

5. A valve for metering gas, said valve comprising:

a valve body including a passage, the valve body having a valve seat internally defining a flow orifice that is closable to cut off gas flow through the passage;

a cylinder open to the passage and axially aligned with the valve seat orifice;

a valve member in the passage and including a valve head engagable with the valve seat to close the orifice;

a piston on the valve member and slidable in the cylinder, the piston and the valve head having, when the valve is closed, opposing approximately equal axially projected cross-sectional areas exposed to the passage for balancing the effects of varying pressure in the passage on the valve member; and seal means between the piston and the valve body for limiting leakage past the piston and cylinder;

wherein said cylinder is formed in the valve body and said seal means includes:

a floating shaft seal slidably surrounding said valve member and having a flange slidably engagable with a sealing surface of the valve body and allowing limited lateral motion of the shaft seal for alignment with the valve member; and a biasing member urging the floating shaft seal axially to force the flange of the shaft seal against the sealing surface of the valve body for preventing leakage of fluid past the piston in the cylinder of the valve body.

6. A valve as in claim 5 including:

a solenoid actuator having a coil and an armature engagable with the valve member and operative to open the valve when the coil is energized;

a second biasing member urging the valve member in a closing direction and operative to close the valve when the coil is deenergized;

second seal means supported in part by said floating shaft seal and having a tubular portion closely surrounding said valve member in an adjacent portion of the actuator; and vent means communicating with said valve member on both sides of said seal means minimize the transmission of gas between the valve body and the solenoid actuator.

7. A valve for metering gas, said valve comprising:

a valve body including a passage, the valve body having a valve seat internally defining a flow orifice that is closable to cut off gas flow through the passage;

a cylinder open to the passage and axially aligned with the valve seat orifice;

a valve member in the passage and including a valve head engagable with the valve seat to close the orifice;

a piston on the valve member and slidable in the cylinder, the piston and the valve head having, when the valve is closed, opposing approximately equal axially projected cross-sectional areas exposed to the passage for balancing the effects of varying pressure in the passage on the valve member;

seal means between the piston and the valve body for limiting leakage past the piston and cylinder;

a solenoid actuator having a coil and an armature engagable with the valve member and operative to open the valve when the coil is energized; and a biasing member urging the valve member against the armature in a closing direction and operative to close the valve when the coil is deenergized;

said armature and said valve member being operatively engaged but detached so that the solenoid actuator may be replaced without disturbing the valve member in the valve body.

8. A valve for metering gas, said valve comprising:

a valve body including a passage, the valve body having a valve seat internally defining a flow orifice that is closable to cut off gas flow through the passage;

a cylinder open to the passage and axially aligned with the valve seat orifice;

a valve member in the passage and including a valve head engagable with the valve seat to close the orifice;

a piston on the valve member and slidable in the cylinder, the piston and the valve head having, when the valve is closed, opposing approximately equal axially projected cross-sectional areas exposed to the passage for balancing the effects of varying pressure in the passage on the valve member;

seal means between the piston and the valve body for limiting leakage past the piston and cylinder wherein the cylinder is formed in the valve body and the seal means includes:

a floating shaft seal slidably surrounding the valve member and having a flange slidably engagable with a sealing surface of the valve body and allowing limited lateral motion of the shaft seal for alignment with the valve member; and a biasing member urging the floating shaft seal axially to force the flange of the shaft seal against the sealing surface of the valve body for preventing leakage of fluid past the piston in the cylinder of the valve body;

wherein said piston has a hollow interior with an open end facing axially away from said valve head;

said valve member includes a hollow stem extending through said valve head to said piston interior; and said valve includes a contact seal engagable with said piston when said valve is closed to enclose the open end of the piston whereby to equalize pressures on said piston interior and on the exterior of the valve head when the valve is closed.

9. A valve as claimed in claim 8 wherein said valve member further comprises a tubular shaft surrounding said hollow stem and extending between said valve head and said piston.

10. A valve as claimed in claim 9 wherein said tubular shaft is integral with said valve head.

11. A valve as in claim 8 wherein said contact seal is carried on said floating shaft seal and engages the open end of the piston when the valve is closed.

12. A valve as in claim 8 wherein said contact seal is carried in the valve body and is engaged by an outer periphery of the piston adjacent the open end when the valve is closed.

13. A valve as in claim 12 wherein the floating shaft seal has a hollow interior and an open end also engaging the contact seal, the hollow interiors of the piston and the floating shaft seal being joined as a sealed volume when the valve is closed.

14. A valve as in claim 8 wherein said contact seal is a floating annulus including both face and radial seal surfaces, said radial seal surface slidingly engaging cylindrical portion of the valve body;

and a second member urging the face seal surface of said annulus axially against the open end of the piston when the valve is closed.

15. A valve as in claim 14 wherein floating shaft seal has a hollow interior that communicates with the hollow interior of the piston through the contact seal annulus to form a sealed volume when the valve is closed.

* * * * *